UNITED STATES PATENT OFFICE.

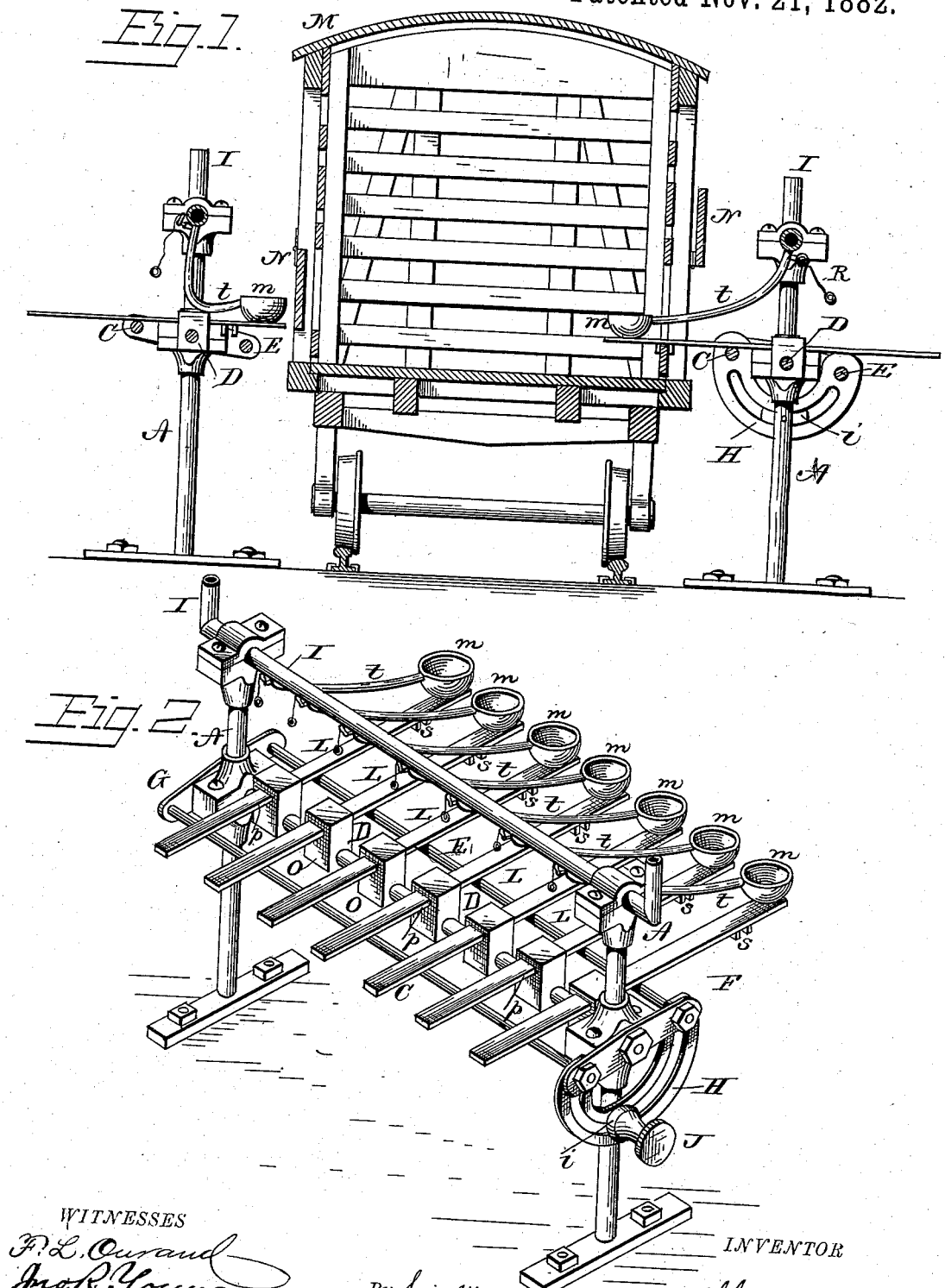

ALFRED D. TINGLEY, OF NEW YORK, N. Y., ASSIGNOR TO CHARLES EDGAR TINGLEY, OF ADRIAN, MICHIGAN.

DEVICE FOR FEEDING AND WATERING STOCK IN CARS.

SPECIFICATION forming part of Letters Patent No. 267,810, dated November 21, 1882.

Application filed March 25, 1882. (No model.)

*To all whom it may concern:*

Be it known that I, ALFRED D. TINGLEY, a citizen of the United States, residing at New York, in the county of New York and State of New York, have invented certain new and useful Improvements in Devices for Feeding and Watering Stock in Cars; and I do hereby declare the following to be a full, clear, and exact description of the invention, such as will enable others skilled in the art to which it appertains to make and use the same.

My present invention consists of an improvement in the device for feeding and watering stock in cars while *in transitu*, which forms the subject of Letters Patent No. 237,641, granted to me February 8, 1881. The subject of that patent was, briefly, a frame arranged at the side of a car-track, provided with separate sliding, swinging, or movable feed boxes or cups and suitable mechanism whereby the feed-receptacles could be moved inside of a car and at a proper elevation to present food or drink to animals in the car. When it was desired to water the stock, water was introduced into each feed-cup through supplementary flexible pipes leading from a main conducting-pipe. The means therein shown and described for moving the feed-receptacles up to and within the car consisted of slides, to the ends of which the feed-boxes were attached, operated by means of racks and pinions, each slide being provided on its under side with a rack engaging with a pinion fixed on a crank-rod running the length of the frame. By turning the crank-rod the boxes were moved forward or back, as desired.

My present invention has for its object the improvement of this form of frame and its mode of operation and the means for operating the feed-boxes, whereby all the feed-boxes may be raised or lowered together, and whereby a sliding lateral as well as a forward-and-back and an up-and-down movement may be given to each of them independently of the other.

My improvement and its application are illustrated in the accompanying drawings, in which Figure 1 is a vertical cross-section of a stock-car and track, showing the feed-frames located on each side thereof; and Fig. 2 is a perspective view of one of my improved frames.

Similar letters refer to similar parts in both figures.

A A are posts, which are rigidly fixed to a platform or to other suitable supports alongside the car-track, and on which are mounted a swinging frame to support the feed boxes or cups and their sliding supports, and the main conducting-pipe for furnishing water to the said receptacles. The swinging frame consists of the rods C D E, united at their ends by arms F G on the outer sides of the posts A A. D, the central rod, passes through and turns loosely in posts A A, by which arrangement this frame is supported and its swinging motion obtained. To the arm F, as shown in Fig. 2, is secured a slotted segmental plate, H. Through a washer, *i*, and the slot in this plate is passed a thumb-screw, J, by means of which said swinging frame is held at any desired position, for the purposes hereinafter mentioned.

L represents sliding bars or handles, rectangular in form, to the outer ends of which are rigidly secured the feed-cups *m*.

O O are blocks on central rod, D, arranged to slide freely from side to side on said rod. These blocks are provided with rectangular-shaped holes or slots *p*, through which the cup-handles L are passed, and in which the said handles can be freely slid backward and forward, and also given a lateral movement. By this form of handle and corresponding apertures through which they pass, the feed-boxes are prevented from tipping or rolling over. The blocks O are loosely secured on the central rod, D, at a point below their center and near the bottom. By thus making the apertures through blocks for the admission of the central rod and the cup-handles sufficiently large, each cup or box is capable of being easily slid from side to side, thrust forward or back in a straight line or at an angle with the car, or moved freely up and down.

The rods C and E serve as supports for the handles at whatever position the latter may be placed; and the handles may also be provided with clutches *s s*, cast or otherwise secured on the under side of the arms, as shown in Fig. 2, by which the said handles may be steadily and firmly held or rested on the car side-boards when the stock is being fed.

M is an ordinary stock-car, provided on its sides with hinged doors N, or any other suitable device or opening, to admit of the passage into and out of the car of the sliding feed and water receptacles.

I is a main water-conducting pipe extending the whole length of the frame, and held in brackets on top of posts A, as shown in Fig. 2; and attached to said main water-conducting pipe, and leading to the cups, are supplementary flexible pipes, as and for the purpose described in my previous patent.

When it is desired to use a portion only of the water-cups the water can be cut off from the remainder by the use of a cut-off, R, located at the junction of each flexible pipe $t$ with the main pipe I. The cut-off used is a common brass cut-off, fastened to the main water-pipe, and provided with a wrench or handle with a ring at the end, by which an attendant who pushes in the feed-boxes can, with a handle or stick properly provided with a hook to catch in the ring, easily and quickly open or shut off communication with the feed-box by swinging the ring-handle of the cut-off one way or another a few inches.

By my improvement the heads of the animals to be fed or watered can be easily reached whatever their position in the car and however the different cars may vary in height or in character and position of the openings through which the stock is to be reached. After the stock is fed or watered the feed-cups can be lowered nearly to the ground by loosening the thumb-screw and turning the swinging frame downward, for the purpose of emptying any remaining contents, and they can then be raised up into nearly a vertical position, and maintained there, if desired, for the purpose of being out of the way of damage, and occupying less room than if held in a horizontal position.

In view of the description of some parts given in my former patent, which do not enter into present claims, and of the objects and advantages to be attained by the general form of my device, further description here is deemed unnecessary.

Having thus described my improvement, what I claim, and desire to secure by Letters Patent, is—

1. A frame arranged on one or both sides of a car-track, provided with separate feed or water receptacles attached to bars or rods, in combination with movable blocks and a supporting-rod, whereby the said receptacles can be independently raised or lowered and slid back and forth, or sidewise, or at an angle, substantially as and for the purpose described.

2. The swinging frame composed of the rods C D E and the arms F G, mounted on suitable supports, in combination with the segmental slotted plate and thumb-screw, substantially as described.

3. The combination of the swinging frame, the independently sliding and tilting boxes or cups and their supports, the main water-conducting pipe, and the flexible connecting-pipes, substantially as described.

In testimony whereof I affix my signature in presence of two witnesses.

ALFRED D. TINGLEY.

Witnesses:
 JOHN B. COOK,
 A. H. PLUMMER.